(12) United States Patent
Kuse et al.

(10) Patent No.: US 11,156,003 B2
(45) Date of Patent: Oct. 26, 2021

(54) STABILIZING RODS FOR STONE SLABS WITH A UNIDIRECTIONAL SCRIM

(71) Applicants: Kolja Kuse, Munich (DE); Walter Schwanekamp, Gescher (DE); Rudolf Hilti, Schaan (LI)

(72) Inventors: Kolja Kuse, Munich (DE); Walter Schwanekamp, Gescher (DE); Rudolf Hilti, Schaan (LI)

( * ) Notice: Subject to any disclaimer, the term of this patent is extended or adjusted under 35 U.S.C. 154(b) by 0 days.

(21) Appl. No.: 16/612,457

(22) PCT Filed: May 9, 2018

(86) PCT No.: PCT/EP2018/000252
§ 371 (c)(1),
(2) Date: May 4, 2020

(87) PCT Pub. No.: WO2018/206150
PCT Pub. Date: Nov. 15, 2018

(65) Prior Publication Data
US 2020/0270872 A1   Aug. 27, 2020

(51) Int. Cl.
*B32B 3/08* (2006.01)
*E04F 13/14* (2006.01)
*B32B 3/30* (2006.01)
*B32B 5/26* (2006.01)
*B32B 9/00* (2006.01)
*B32B 13/14* (2006.01)

(52) U.S. Cl.
CPC .............. *E04F 13/14* (2013.01); *B32B 3/08* (2013.01); *B32B 3/30* (2013.01); *B32B 5/26* (2013.01); *B32B 9/002* (2013.01); *B32B 9/005* (2013.01); *B32B 13/14* (2013.01)

(58) Field of Classification Search
CPC ..... Y10T 428/24124; B32B 3/08; B32B 3/30; B32B 9/002; B32B 9/005; E04F 15/02166; E04F 15/085; E04F 15/08; E04F 13/14; E01C 5/02; E01C 5/08
See application file for complete search history.

(56) References Cited

FOREIGN PATENT DOCUMENTS

DE   202006009793 U1 * 12/2006   ............ E04F 11/116
DE   202007015918 U1 *  3/2008   ............ C04B 37/008

OTHER PUBLICATIONS

Machine translation of DE-202007015918-U1 (Year: 2020).*
Machine translation of DE-202006009793-U1 (Year: 2020).*

* cited by examiner

*Primary Examiner* — Alexander S Thomas
(74) *Attorney, Agent, or Firm* — Mark M. Friedman

(57) ABSTRACT

Disclosed is a stone or ceramic plate stabilized with the aid of fiber-coated stabilizing strips, which are mounted below the edges of the stone slat or incorporated below the edges in the stone slat. The strips are characterized in that, for reasons of optimizing the material, they have an arrangement of the fiber direction at the top and bottom for the respective load case as a tension belt and are therefore designed with unidirectional fiber layers and these fibers are as close as possible to the respective surface of the top and bottom lie to be stabilized stone plate. The tension belt preferably has a height or thickness which is greater than half the thickness of the stone slab to be stabilized and a width which is appropriate to the total load at the respectively occurring bending load.

10 Claims, 2 Drawing Sheets

STABILIZING RODS FOR STONE SLABS WITH A UNIDIRECTIONAL SCRIM

The stabilization of ever thinner stone and ceramic tiles is becoming increasingly important for weight and cost reasons. Also, thin stone slabs made of natural stone, artificial stone or ceramics correspond to a main stream that appreciates the technical optimization and the reduction of costs. State of the art are bars of carbon fiber or stone fiber-coated stone, which are described in DE 20 2006 008 100.3 for the stabilization of stone slabs. Such carriers of coated stone or carbon solid material are introduced under or in stone plates below the edges, as described in DE 20 2006 008 100.3.

Another development of this invention now goes into the detail of fiber packaging. Carbon fibers or other fibers such as glass fibers or stone fibers can be used very targeted and optimized, especially in combination with stone material or ceramic material or other pressure-resistant materials such as hardwood or glass, preferably to take up tensile forces.

In this invention, the fiber layers used are optimized on the different sides of such bars and a new teaching for the incorporation of such bars as a tension belt in or under natural stone slabs is disclosed. The stabilizing rods are closely examined with respect to the upper side and the lower side. On the underside mainly fibers are required, which absorb the tensile forces in longitudinal bending direction, in order to remain crack-free at a view from the surface of the stone plate to be stabilized against bending stress on the underside. At the top fibers are required, which must absorb the tensile forces in the transverse direction and in addition also in the longitudinal direction, so that on the one hand the edge does not break off by pressure from the top of the plate, on the other hand, the plate should be saved against cracks through convex beding from view of the surface and can be bent crack free also in the other direction, which can not be excluded during installation and associated handling of such plates. The cost intensive fiber layers needed are minimized by making the major part of the cross section of the stabilizing bar, which is incorporated into a cutout on the underside of the plate, for the most part of inexpensive ceramic material or stone material or wood, so that the mass of the fibers to be used is optimized.

This is preferably done by the use of unidirectionally oriented fiber layers. At the bottom the fiber layer is arranged only in the longitudinal direction and on the top with at least one layer in the transverse direction and if necessary, additionally with a layer in the longitudinal direction. In order to use the tensile effect of the fibers at the top of the belt—which has on both sides of the belt mainly the function of a tension belt—as efficiently as possible to protect the surface and the underside of the stone plate and to optimize the crack suppressing effect on the top of the stone plate, the tension-stable layer at the bottom is allocated in a deepest possible groove in a level preferably as close as possible below the surface of the plate to be stabilized, induced and preferably force fitting glued. In order to develop the tensile force on the top as efficiently as possible, the stabilizing bar is thus introduced with the plane of its upper side above the middle layer of the stone slab and as close as possible under the surface of the stone slab to be stabilized, preferably with the top of the belt in the upper half of the cross section of the stone plate to be stabilized. The rod is characterized in that it is designed in both bending directions as a tension belt. Both sides of the belt absorb mainly tensile forces in both bending directions, whereby the fibers are used with their main advantage, namely in the case of tensile load. The present invention optimizes the expensive fiber input and hence the cost, and makes large thin slabs bendable in both convex and concave beding directions without breakage, which is an excellent new property for the handling and break-free installation of such slabs and the cost of producing thin sStone slabs that are used, for example, as kitchen worktops, facade panels and other slabs of stone, artificial stone or ceramic.

The amazing effect that results from plates stabilized in this way is that without being coated over the entire surface with the fiber, the high stiffness of the carbon fiber stabilizes the entire margins by stabilizing them only marginally so that the "weak" stone with a youngs modulus of about 70 GPa will even not break in the middle when bent in one or the other longitudinal direction, since the few fiber material is so stiff in the case of carbon fibers are equiped with several 1000 GP in that the stabilizing forces can be transferred to the middle of the plate without the plate being subjected to transverse cracks in the middle. The result is a stabilization method that eliminates the need for expensive full-surface fiber coatings, which has a significant impact on the stabilization cost and the amount of expensive carbon fiber materials to be used.

The closest prior art is DE 20 2006 008 100.3, in which similar stabilizing strips are used, but these plates are not flexible in both directions unless UD fiber fabrics are used, which in this invention increase the tensile stiffness of the overall assembly in that the plates can be bent in both bending directions—with respect to the longitudinal direction of the stabilizing strips—without causing the plate to be stabilized to crack on the underside or topside. This rigidity can not be achieved without unidirektional fiber application, which is why in DE 20 2006 008 100.3, this flexibility is not mentioned, but elaborate stiffening egg-box-geometries necessary in the substructure to prevent cracking. This stiffening measure can be dispensed with this invention, which was previously for the transport and the phase during the installation of such plates of crucial importance. Now the panels can be bent by the personnel within limits of transportation and installation, without getting cracks, without the need for additional stabilizing measures, which previously required valuable space.

DETAILED DESCRIPTION

Figure 1:
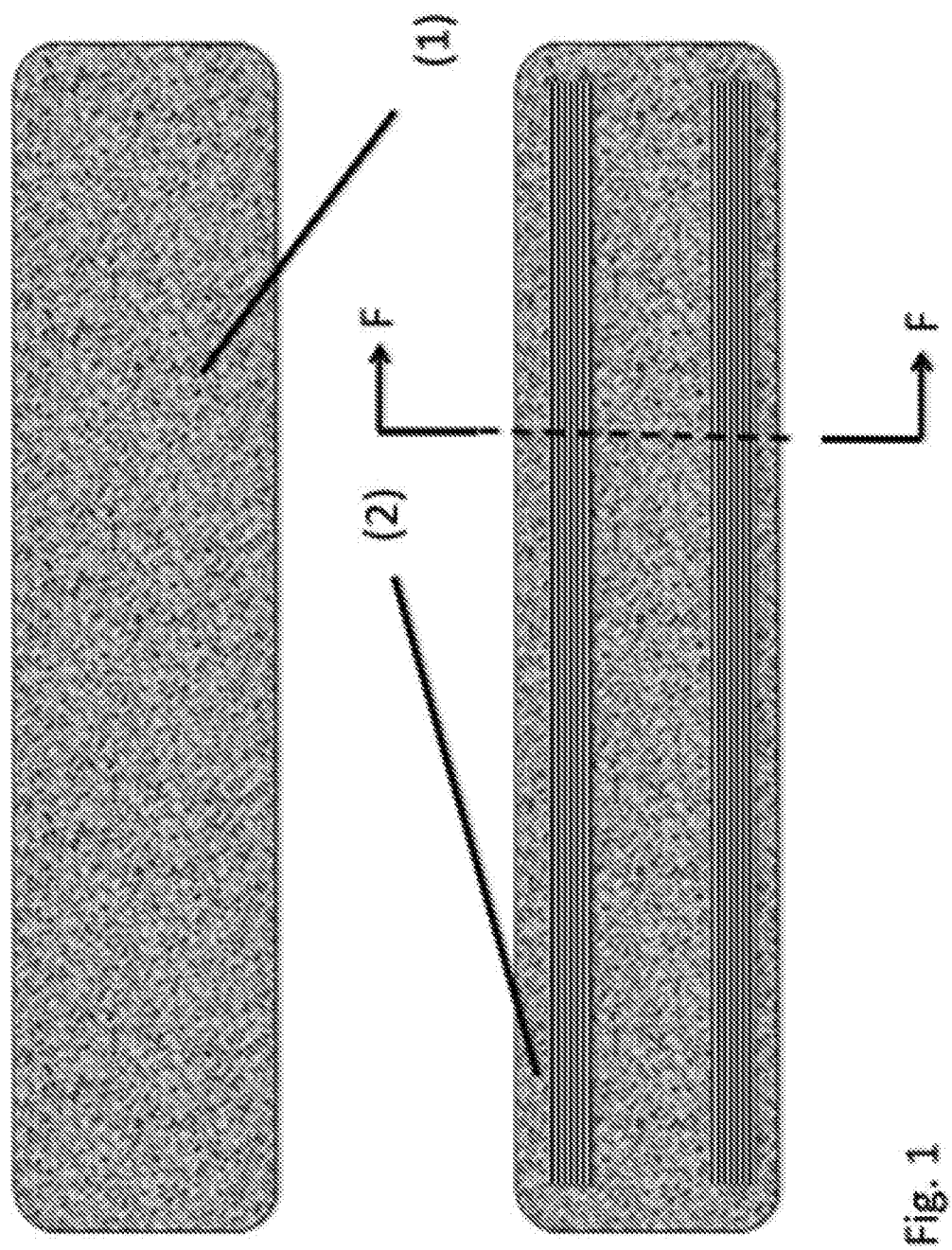
FIG. 1 shows the plate with a thickness of about 10 mmm at the top (1) shows only stone and on the bottom (2) is equipped with carbon fiber-coated ceramic strips being glued into a cutout in the Stone slab.
Figure 2:
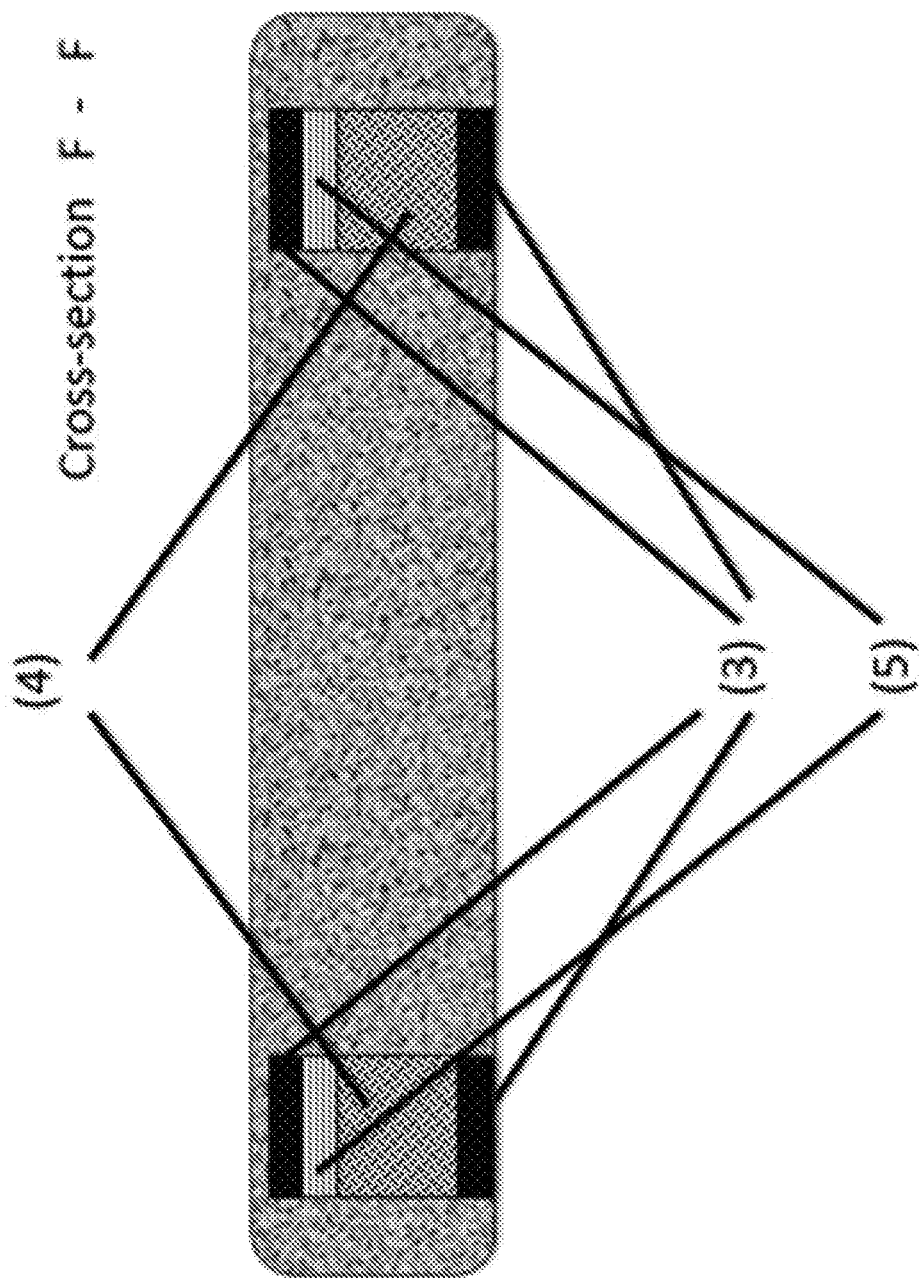
FIG. 2 shows the cross section view of the plate.

The invention is carried out as shown in FIG. 1, for example, so that a granite plate with a thickness of about 10 mm at the top (1) shows only stone and on the bottom (2) is equipped with carbon fiber-coated ceramic strips being glued into a cutout in the Stone slab. In FIG. 2, the cross section of the plate is shown, wherein the quasi-completely in the middle located ceramic strip (4) is coated on the top and bottom with a UD carbon fiber (3) in the longitudinal direction and on the top with a UD carbon fiber layer (5) in the transverse direction lying between the UD Longitudinal fiber and the ceramic strips.

The two UD longitudinal fiber layers protect the entire plate at the top and bottom against breakage at bending load in the longitudinal direction of the plate, wherein the UD fiber layer in the transverse direction prevents the breaking of the edge bending load by bending at the edge of the plate in the transverse direction, if the plate for example protrudes beyond the support of a kitchen cabinet body. Special stability is achieved when the carbon fiber is applied under prestress onto the ceramic strip.

The invention claimed is:

1. An arrangement comprising a stone plate, artificial stone plate or ceramic plate stabilized by one or more strips of material at an edge or edges at the bottom of the plate, the stabilizing strip itself being made of stoneware, ceramic, glass, wood or other pressure-resistant material, which is coated on the top and bottom with fibers,
characterized in that the fibers are aligned at the bottom of the strip mainly in the longitudinal direction,
wherein the strip is specially designed to be tensile resistant in the longitudinal direction and wherein the top of the strip is mounted, inserted or glued in a cutout below a surface of the plate so that the top of the strip is located above a center line of the plate stabilized by the one or more strips.

2. The arrangement according to claim 1, characterized in that the fiber layers are arranged on the upper side of the strip mainly in the longitudinal direction.

3. The arrangement according to claim 1, characterized in that the fiber layers are arranged on the upper side of the strip mainly in the transverse direction.

4. The arrangement according to claim 1, characterized in that the fiber layers are arranged on the upper side of the strip in a layer exclusively in the transverse direction and are aligned in a further layer on the upper side exclusively in the longitudinal direction.

5. The arrangement according to claim 1, characterized in that the uppermost fiber layer is arranged on the upper side of the strip exclusively in the longitudinal direction as a layer.

6. The arrangement according to claim 1, characterized in that the fiber layers are applied under prestress to the strip of pressure-stable material.

7. The arrangement according to claim 1, characterized in that the fiber layer consists of carbon fibers, glass fibers or stone fibers or a mixture of these fibers.

8. The arrangement according to claim 1, characterized in that the coated strip in its core consists of natural stone, basalt, granite, marble, ceramic, glass ceramic, artificial stone, concrete, glass, other mineral materials or hardwood.

9. The arrangement according to claim 1, characterized in that the coefficient of expansion of an existing stoneware strip is substantially equal to that of the stabilized stone bar.

10. The arrangement according to claim 1, characterized in that the strip has a specially designed tensile stable top of the strip in the longitudinal direction, wherein the strip with the specially designed tensile stable top is located, introduced or glued in the cutout below the surface of the plate and close to the surface of the plate stabilized by the one or more strips.

* * * * *